United States Patent [19]
Moser et al.

[11] 3,843,670
[45] Oct. 22, 1974

[54] CERTAIN 4-SUBSTITUTED-1-THIADIAZOLYL-3-ALKYL-2,5-DIOXO-IMIDAZOLIDINES AND A SYNTHESIS

[75] Inventors: Hans Moser, Magden; Christian Vogel, Binningen, both of Switzerland

[73] Assignee: Ciba-Geigy Corporation, Ardsley, N.Y.

[22] Filed: Sept. 27, 1972

[21] Appl. No.: 292,709

[30] Foreign Application Priority Data
Sept. 30, 1971 Switzerland.................. 14213/71

[52] U.S. Cl.................. 260/306.8 D, 71/87, 71/90
[51] Int. Cl............................................ C07d 99/10
[58] Field of Search......................... 260/306.8 D

[56] References Cited
OTHER PUBLICATIONS
Pauly et al. Ber., 63, 2063–2069 (1930).
Wagner et al., Synthetic Organic Chemistry, John Wiley & Sons, New York, 1953, p. 92.

*Primary Examiner*—Richard J. Gallagher
*Attorney, Agent, or Firm*—Harry Falber; Frederick H. Rabin

[57] ABSTRACT

1-[1',2',4'-thiadiazol-5'-yl]-2,5-dioxo-imidazolidines and 1-[1',3',4'-thiadiazol-5'-yl]-2,5-dioxo-imidazolidines are effective weed killers in crop cultures such as wheat, cotton, soya bean, maize. They are suitable as pre-emergence and post-emergence herbicide.

9 Claims, No Drawings

CERTAIN 4-SUBSTITUTED-1-THIADIAZOLYL-3-ALKYL-2,5-DIOXO-IMIDAZOLIDINES AND A SYNTHESIS

The present invention relates to substituted 1-thiadiazolyl-2,5-dioxo-imidazolidines, to processes for their production, also to herbicidal agents containing these new compounds as active substances, as well as to the selective control of weeds by application of the new active substances and of the agents containing them.

The new 1-thiadiazoyl-2,5-dioxo-imidazolidines correspond to formula I

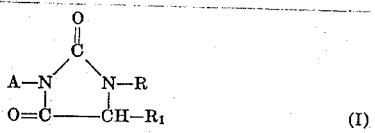

wherein

A represents a 1,2,4-thiadiazolyl-(5)- or 1,3,4-thiadiazolyl-(5)-radical which is substituted on the only substitutable C-atom, in the 3- or 2-position by halogenoalkyl, alkylthio, alkylsulphinyl, alkylsulphonyl or dialkylsulphamoyl, R represents a lower alkyl radical, $R_1$ represents halogen or a radical $-OR_2$ wherein $R_2$ denotes hydrogen, or the group $-CO-Z$ in which Z stands for alkylamino, dialkylamino, alkyl, halogenoalkyl or alkylthio, and, finally, wherein $R_1$ also represents a group of the formula

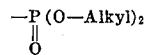

or

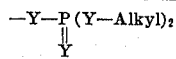

wherein the individual substituents Y independently of each other represent oxygen or sulphur.

As halogen atoms for the radical $R_1$ are meant chlorine, bromine and iodine, with chlorine being preferred.

By alkyl radicals, which can be present on their own or bound to O, N or to S, are meant methyl, ethyl, n-propyl or isopropyl.

Of particular value are 1-[1',3',4'-thiadiazol-5'-yl]-2,5-dioxoimidazolidines of formula I wherein R represents the methyl group. Of these, the compounds with $R_1 = OH$ constitute an important subgroup of selective herbicides. Another important subgroup comprises compounds wherein $R_1$ represents halogen, a halogenoacetyl, alkylcarbamoyloxy, dialkylcarbamoyloxy, or an O,O-dialkyldithiophosphoryl group.

The new compounds of formula I are obtained according to the invention by a process in which a thiadiazdylurea, substituted according to the definition for A and R in formula I, of formula II

A - NH - CO - NH - R    II.

is reacted with glyoxylic acid in an organic solvent; and, optionally, in the thus obtained substituted 1-thiadiazolyl-4-hydroxy-2,5-dioxo-imidazolidine of formula III

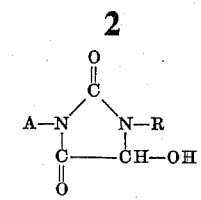

the hydroxyl group in the 4-position substituted by another of the radicals defined under $R_1$:

a. The substitution of the hydroxyl group by a halogen atom is effected most advantageously by the reaction of (III) with a thionyl halide $SOHal_2$.

b. The thus obtained 4-halogeno-2,5-dioxo-imidazolidine is suitable for the reaction with reactive compounds of the type $HR_1$ or $MeR_1$ (Me = alkali metal), in order to introduce other organic radicals corresponding to the definition for $R_1$ by elimination of H-halogen or Me-halogen. For the introduction of dialkylphosphoryl groups $-PO(O-alkyl)_2$, the corresponding 4-halogeno-2,5-dioxo-imidazolidine is reacted with a trialkylphosphite.

c. The substitution of the hydroxyl group in compound III by a group $-O-CO-NH-$ alkyl can advantageously be carried out by reaction of compound III with an alkylisocyanate in the presence of a condensation catalyst such as pyridine, triethylamine, etc..

d. To effect the substitution of the hydroxyl group by a group

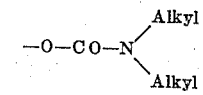

the compound III is advantageously reacted with a dialkylcarbamic acid halide in the presence of tertiary amines such as pyridine, triethylamine, etc..

e. For substitution of the hydroxyl group by a group alkyl-CO-O- or halogenoalkyl-CO-O—, the compound of formula III is reacted with a fatty acid halide or fatty acid anhydride, or with an α-halogen fatty acid halide or an α-halogen fatty acid anhydride, preferably in the presence of tertiary amines.

f. Finally, the substitution of the hydroxyl group by a group $-O-CO-S-$ alkyl is effected by the reaction of the compound of formula III with a chlorocarbonic acid thioalkyl ester, in the presence of tertiary amines.

All the mentioned reactions under (b) to (f) are performed in the presence of an organic solvent or diluent, and in the presence of an acid-binding agent or of a basic condensation agent.

Suitable solvents or diluents for all the above mentioned reactions are aliphatic and aromatic hydrocarbons and halogenated hydrocarbons such as benzene, toluene, chloroform, methylene chloride, ketones, particularly acetone, ethers and ethereal compounds such as dioxane, as well as esters, nitriles, N,N-dialkylated amides, pyridine, etc., and also mixtures of such solvents with each other.

As acid-binding agents and also as condensation agents it is possible to use, amongst other things, tertiary amines such as trialkylamines, as well as pyridine and pyridine bases; and as reaction accelerator for the reaction according to (b) also dimethylformamide.

The reaction temperatures for the mentioned reactions are in the range of 0° to 150°C.

The 1-thiadiazolyl-2,4-dioxo-5-hydroxy-imidazolidines formed in small amounts as by-products in the first reaction step can be easily separated by recrystallisation of the desired compounds of formula III.

The following examples illustrate the production of the new substituted 1-thiadiazolyl-2,5-dioxo-imidazolidines of formula I. Further active substances of this formula, which have been prepared by the methods described in the examples and defined in the foregoing, are listed in the attached table. The temperatures are given in degrees Centigrade.

EXAMPLE 1

1-[2'-Trifluoromethyl-1',3',4'-thiadiazolyl-(5')]-3-methyl-4-hydroxy-2,5-dioxo-imidazolidine An amount of 45.2 g of N-[2-trifluoromethyl-1,3,4-thiadiazolyl-(5)]-N'-methylurea and one of 20.8 g of 97 percent glyoxylic acid monohydrate are suspended in 700 ml of absolute benzene; the suspension is then refluxed, with stirring, for 6 hours with a water separator. After this period of time, 8.5 ml of water has separated. After cooling to room temperature, the precipitate is filtered off and washed firstly with benzene and then with water. After recrystallisation from acetonitrile, an amount of 31.8 g of the desired imidazolidine, M.P. 192°, is obtained (with decomposition) [= compound 2].

EXAMPLE 2

1-[3'-Dichloromethyl-1',2',4'-thiadiazolyl-(5')]-3-methyl-4-hydroxy-2,5-dioxo-imidazolidine An amount of 17.4 g of N-[3-dichloromethyl-1,2,4-thiadiazolyl-(5)]-N'-methylurea and one of 8.7 g of 97 percent glyoxylic acid monohydrate are suspended in 170 ml of absolute benzene. The suspension is then refluxed for 5 hours, with stirring, with a water separator; during this period of time the amount of water separated is 3.6 ml. After cooling to room temperature, the crude product is filtered off, washed with benzene and then with water, and dried over $P_2O_5$. There is thus obtained 15.2 g of the desired imidazolidine, M.P. 195°, (with decomposition). [= compound 15].

Several 1-[1',3',4'-thiadiazolyl-(5)]-3-methyl-2,5-dioxo-imidazolidines (produced according to Example 1) of the more limited formula (Ia) are listed in the following Table I.

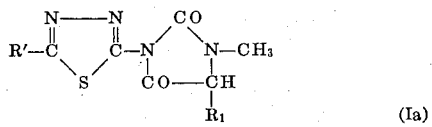

(Ia)

TABLE I

| No. | R' | $R_1$ | Melting point |
|---|---|---|---|
| 1 | $CH_3SO_2$— | OH | 224° (decomp.). |
| 2 | $F_3C$— | OH | 192° (decomp.). |
| 3 | $CH_3\!\!>\!\!N$—$SO_2$—$\!\!<\!\!CH_3$ | OH | 193° (decomp.). |
| 4 | $CH_3SO$— | OH | 200° (decomp.). |
| 5 | $CH_3S$— | OH | 184–186°. |
| 6 | $F_3C$— | Cl | 127–129°. |
| 7 | $F_3C$— | —O—CO—$CH_2Cl$ | 116–120°. |
| 8 | $F_3C$— | —O—CO—$NHCH_3$ | 197° (decomp.). |
| 9 | $F_3C$— | —O—CO—$N(CH_3)_2$ | |

Table I—Continued

| No. | R' | $R_1$ | Melting point |
|---|---|---|---|
| 10 | $F_3C$— | —S—P(=S)—$(OCH_3)_2$ | 110–112°. |
| 11 | $F_3C$— | —O—CO—$CH_3$ | |
| 12 | $F_3C$— | —O—CO—S—$CH(CH_3)_2$ | |

The following Table II contains 1-[1',2',4'-thiadiazolyl-(5')]-3-methyl-2,5-dioxo-imidazolidines of the more restricted formula (Ib), produced according to Example 2.

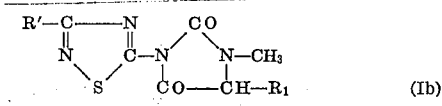

(Ib)

Table II

| No. | R' | $R_1$ | Melting point |
|---|---|---|---|
| 13 | $Cl_3C$— | OH | 195°(decomp.) |
| 14 | $F_3C$— | OH | 190–195° |
| 15 | $Cl_2CH$— | OH | 195°(decomp.) |

The new 1-thiadiazolyl-2,5-dioxo-imidazolidines of formula I are readily soluble in strongly polar and aprotic organic solvents, such as, e.g. in dimethylformamide, dimethylsulphoxide and methyl-cellosolve. At elevated temperature they are soluble also in acetonitrile, in dioxane and in other solvents, but difficultly soluble to insoluble, however, in water and in most hydrocarbons.

Most of the 2-substituted 1,3,4-thiadiazolylureas serving as starting materials are known compounds; and likewise some 3-substituted 1,2,4-thiadiazolylureas have become known (e.g. Brit. Patent No. 1,254,468 and Brit. Pat. No. 1,282,308). If, by virtue of the chosen substitution of the thiadiazolyl radical, a thiadiazolylurea of the general formula II not yet described in the literature should serve as starting material, which is a possibility particularly in the series of 1,2,4-thiadiazolylureas, then this starting material can be easily produced analogously to the prior known compounds of this class.

The new active substances of formula I possess excellent herbicidal properties and are suitable in particular for the control of gramineous and broad-leaved weeds in various cultivated crops; they are especially suitable as pre-emergence herbicides in cotton crops. Annual or perennial types of weeds which are deep-rooted and difficult to control are destroyed or inhibited in growth by the active substances of formula I with a high measure of success. Thus, field weeds, such as, e.g. millet varieties (Setaria sp.), mustard varieties (Sinapis sp.), goosefoot varieties (Chenopodiacae), slender foxtail (Alopecurus sp.) and other pig weed varieties, e.g. Amaranthus sp., grasses, e.g. Lolium sp., compositae, e.g. Taraxacum sp., wild chamomile varieties (Matricaria sp.), are destroyed or inhibited in growth, without damage being caused to useful plants such as cotton, maize, corn, sorghum, etc., Furthermore, varieties of weeds difficult to control in rice crops are controlled by these active substances, e.g. Echinochloa varieties in wet rice crops.

The applied amounts vary and are dependent on the time of application; they are between 0.1 and 10 kg of active substance per hectare; in the case of application before emergence of the plants, the amount is up to 4 kg of active substance per hectare, and after emergence of the plants the amount is 3 to 10 kg of active substance per hectare. For total destruction of the entire weed crop, however, it is necessary to apply as a rule more than 10 kg of active substance per hectare.

The operation of the normal crop rotation is not impaired in consequence of application of the new active substances.

*Galium aparine*

Cultivated plants:

| | |
|---|---|
| cotton | (*Gossypium herbaccara*) |
| soya bean | (*Glycine soja*) |
| maize | (*Zea Mays*) |

The respective amounts applied in this test are given in the following table. The evaluation is made on the basis of the following scale of values:

9 = plants undamaged (control)
1 = plants dead
8–2 = intermediate stages of damage

TABLE 1

| Comp. No. | Kg./hectare | Poa trivialis | Lolium multiflorum | Alopecurus myosuorides | Digitaria sanguin | Echinochloa crus galli | Setaria italica | Amaranthus spez. | Chrysanthemum leuc. | Sinapis alba | Vicia sativa | Pastinaca sativa |
|---|---|---|---|---|---|---|---|---|---|---|---|---|
| 1 | 0.5 | 2 |  |  | 1 | 1 | 1 |  | 2 | 3 | 4 |  |
|  | 1 | 1 |  | 1 | 1 | 1 | 1 |  | 1 | 2 | 2 |  |
|  | 2 | 1 | 2 | 1 | 1 | 1 | 1 | 4 | 1 | 1 | 1 | 4 |
|  | 4 | 1 | 2 | 1 | 1 | 1 | 1 | 1 | 1 | 1 | 1 | 1 |
| 2 | 0.5 | 2 | 2 | 3 | 2 | 1 | 2 | 3 | 1 | 1 |  | 3 |
|  | 1 | 1 | 1 | 2 | 1 | 1 | 2 | 1 | 1 | 1 |  | 2 |
|  | 2 | 1 | 1 | 2 | 1 | 1 | 1 | 1 | 1 | 1 | 2 | 2 |
|  | 4 | 1 | 1 | 1 | 1 | 1 | 1 | 1 | 1 | 1 | 1 | 1 |
| 3 | 0.5 | 1 |  | 3 | 1 | 1 | 1 | 1 | 1 | 3 | 3 | 1 |
|  | 1 | 1 | 2 | 1 | 1 | 1 | 1 | 1 | 1 | 1 | 2 | 2 |
|  | 2 | 1 | 1 | 1 | 1 | 1 | 1 | 1 | 1 | 1 | 2 | 2 |
|  | 4 | 1 | 1 | 1 | 1 | 1 | 1 | 1 | 1 | 1 | 1 | 1 |
| 4 | 0.5 |  |  |  |  | 3 |  | 3 | 2 |  | 3 |  |
|  | 1 |  |  |  | 1 | 1 |  | 3 | 2 |  | 3 |  |
|  | 2 |  |  | 2 | 1 | 1 | 1 | 1 | 1 | 2 | 1 | 3 |
|  | 4 |  |  | 1 | 1 | 1 | 1 | 1 | 1 | 2 | 1 | 2 |
| 5 | 0.5 |  |  |  | 3 | 3 | 3 | 2 | 2 |  |  | 3 |
|  | 1 |  |  | 2 | 1 | 2 | 1 | 1 | 1 |  |  | 3 |
|  | 2 |  | 2 | 1 | 1 | 1 | 1 | 1 | 1 | 2 |  | 1 |
|  | 4 |  | 1 | 1 | 1 | 1 | 1 | 1 | 1 | 1 |  | 1 |
| 15 | 0.5 |  |  |  | 3 | 3 |  | 1 | 1 |  |  | 3 |
|  | 1 |  | 3 | 2 | 3 | 3 | 3 | 1 | 1 | 2 |  | 3 |
|  | 2 |  | 2 | 1 | 2 | 2 | 2 | 1 | 1 | 1 |  | 1 |
|  | 4 |  | 1 | 1 | 1 | 2 | 1 | 1 | 1 | 1 |  | 1 |

Table 1a

| Active substance No. | X = | Cotton | | | Action on cultivated plants with X kg/hectare Maize | | | Soya beans | | |
|---|---|---|---|---|---|---|---|---|---|---|
|  |  | 0.5 | 1 | 2 | 0.5 | 1 | 2 | 0.5 | 1 | 2 |
| 1 |  | 8 | 7 | — | 8 | 7 | — | 8 | 8 | — |
| 2 |  | — | — | — | 7 | 6 | — | 7 | 6 | — |
| 3 |  | 8 | 6 | — | 8 | 6 | 6 | 8 | 8 | 6 |
| 4 |  | 9 | 8 | 7 | 8 | 7 | — | 8 | 7 | 7 |
| 5 |  | 9 | 8 | — | 8 | 7 | — | 9 | 9 | 8 |
| 15 |  | 8 | 7 | 7 | 9 | 8 | 8 | 9 | 8 | 8 |

The herbicidal action of the active substances according to the invention was determined by the following tests:

1. Herbicidal action with application of the active substances before emergence of the plants (pre-emergence application)

Immediately after the sowing of the test plants, the active substances are applied as an aqueous suspension, obtained from a 25 percent wettable powder, to the surface of the soil. The seed dishes are then maintained at 22°–23° with 50–70 percent relative humidity. An evaluation of the test results is made after 28 days.

The following were used as test plants:

Weeds:
*Poa trivialis*
*Lolium multiflorum*
*Alopecurus myosuroides*
*Digitaria sanguin*,
*Echinochloa crus galli*
*Setaria italica*
*Amaranthus spec.*
*Chrysanthemum leuc.*
*Sinapis alba*
*Vicia sativa*
*Pastinaca sativa*

2. Herbicidal action with application of the active substances after emergence of the plants (post-emergence application)

The cultivated plants, oats, wheat, maize, soya beans and sorghum, as well as the weeds:

*Setaria italica*,
*Digitaria sanguinalis*,
*Echinochloa crus galli*,
*Sinapis alba*,
*Taraxacum officinale*,
*Vicia sativa*,
*Matricaria chamomilla*,
*Pastinaca sativa*, are sown in seed trays. In the 4-leaf stage, approximately after 12 days, the plants are sprayed with a 2 percent aqueous emulsion of the active substances. The test plants are subsequently maintained in daylight at a temperature of 25°–28°C with 40–50 percent relative humidity.

An evaluation of the test results is made 15 days after application of the active substances on the basis of the scale of values described in the preceding test.

The 2 percent aqueous emulsion was obtained, by dilution with water, from a 25 percent emulsifiable concentrate of the following composition: 25 parts of active substance, 32.5 parts of isophorone, 32.5 parts of methyl ethyl ketone, 10 parts of a combination emulsifier consisting of nonyl phenol polyoxyethylene and dodecylbenzenesulphonic acid calcium salt.

ple, improve the adhesiveness of the active substances on plants and on parts of plants (adhesives and agglutinants), and/or ensure a better wettability (wetting agents) and dispersibility (dispersing agents). Suitable

TABLE 2

| Comp. No. | Kg./hect. | Lolium perenne | Setaria italica | Digitaria sanguinalis | Echinochloa crusgalli | Sinapis alba | Taraxacum officinale | Vicia sativa | Matricaria chamomilla | Pastinaca sativa | Oats | Wheat | Maize | Soya beans | Sorghum |
|---|---|---|---|---|---|---|---|---|---|---|---|---|---|---|---|
| 1 | 0.5 | | 2 | 1 | 1 | 1 | 3 | 3 | 1 | 2 | 7 | 8 | | 7 | 7 |
| | 1 | | 2 | 1 | 1 | 1 | 3 | 2 | 1 | 1 | 7 | 7 | | 7 | 7 |
| | 2 | | 1 | 1 | 1 | 1 | 2 | 1 | 1 | 1 | | | | 6 | 6 |
| 3 | 0.5 | | 3 | 3 | 1 | 1 | | | | | 7 | 9 | 8 | 8 | 7 |
| | 1 | 2 | 1 | 1 | 1 | 1 | | 2 | 2 | | 6 | 7 | 6 | 7 | 7 |
| | 2 | 2 | 1 | 1 | 1 | 1 | 1 | 1 | 1 | | | | 6 | 7 | 7 |
| 4 | 0.5 | | 1 | 1 | 2 | 1 | 2 | 1 | 1 | 2 | 8 | | 9 | | 8 |
| | 1 | | 1 | 1 | 1 | 1 | 2 | 1 | 1 | 2 | 7 | | 8 | | 7 |
| | 2 | | 1 | 1 | 1 | 1 | 1 | 1 | 1 | 1 | 6 | | 8 | | 7 |
| 5 | 0.5 | | 1 | 1 | 3 | 1 | 3 | 2 | 1 | 3 | 9 | 9 | | | |
| | 1 | | 1 | 1 | 2 | 1 | 2 | 1 | 1 | 2 | 9 | 9 | | | |
| | 2 | | 1 | 1 | 1 | 1 | 2 | 1 | 1 | 2 | 7 | 8 | | | |
| 14 | 1 | 3 | | | 3 | 3 | 3 | | 2 | 2 | | 8 | 8 | | 7 |
| | 2 | 2 | | | 2 | 2 | 1 | | 1 | 1 | | 7 | 7 | | 7 |
| | 4 | 2 | | | 2 | 1 | 1 | | 1 | 1 | | 7 | 7 | | 6 |

The preceding tests show the broad herbicidal sphere of action of the active substances according to the invention. Compared with these active substances, known thiadiazolylureas, e.g. the 2-alkyl-1,3,4-thiadiazolyl(5)-ureas of the Dutch 'Auslegeschrift' No. 68.13438, and the 1,2,4-thiadiazolyl(5)-ureas of the Dutch 'Auslegeschrift' No. 68.13437, even in applied amounts of 5 kg of active substance per hectare, have only a slight herbicidal action.

Herbicidal agents according to the invention are produced in a manner known per se by the intimate mixing and grinding of active substances of the general formula I with suitable carriers, optionally with the addition of dispersing agents or solvents which are inert to the active substances. The active substances can be obtained and used in the following forms:

solid preparations: dusts, scattering agents, granulates, (coated granulates, impregnated granulates and homogeneous granulates);

water-dispersible concentrates of the active substance: wettable powders, pastes, emulsions;

liquid preparations: solutions.

The solid preparations (dusts, scattering agents, granulates) are produced by the mixing of the active substances with solid carriers. Suitable carriers are, e.g. kaolin, talcum, bole, loess, chalk, limestone, ground linestone, Attaclay, dolomite, diatomaceous earth, precipitated silicic acid, alkaline-earth silicates, sodium and potassium aluminum silicates (feldspar and mica), calcium and magnesium sulphates, magnesium oxide, ground synthetic materials, fertilisers such as ammonium sulphate, ammonium phosphates, ammonium nitrate, urea, ground vegetable products such as bran, bark dust, sawdust, ground nutshells, cellulose powder, residues of plant extractions, active charcoal, etc., alone or in admixture with each other.

The particle size of the carriers is for dusts advantageously up to about 0.1 mm; for scattering agents from about 0.075 mm to 0.2 mm; and for granulates 0.2 mm or coarser.

The concentrations of active substance in the solid preparation forms are from 0.5 to 80 percent.

To these mixtures may also be added additives stabilising the active substance, and/or non-ionic, anionactive, and cation-active substances, which, for example, improve the adhesiveness of the active substances on plants and on parts of plants (adhesives and agglutinants), and/or ensure a better wettability (wetting agents) and dispersibility (dispersing agents). Suitable adhesives are, for example, the following: olein/lime mixture, cellulose derivatives (methyl cellulose, carboxymethyl cellulose), hydroxyethyl glycol ethers of monoalkyl and dialkyl phenols having 5 to 15 ethylene oxide radicals per molecule and 8 to 9 carbon atoms in the alkyl radical, ligninsulphonic acid, its alkali metal and alkaline-earth metal salts, polyethylene glycol ethers (carbowaxes), fatty alcohol polyethylene glycol ethers having 5 to 20 ethylene oxide radicals per molecule and 8 to 18 carbon atoms in the fatty alcohol moiety, condensation products of ethylene oxide, propylene oxide, polyvinyl pyrrolidones, polyvinyl alcohols, condensation products of urea and formaldehyde, as well as latex products.

Water-dispersible concentrates of active substance, i.e. wettable powders, pastes and emulsion concentrates, are agents which can be diluted with water to obtain any desired concentration. They consist of active substance, carrier, optionally additives which stabilise the active substance, surface-active substances, and anti-foam agents and, optionally, solvents. The concentration of active substance in these agents is 5 to 80 percent.

The wettable powders and the pastes are obtained by the mixing and grinding of the active substances with dispersing agents and pulverulent carriers, in suitable devices, until homogeneity is attained. Suitable carriers are, e.g. those previously mentioned in the case of solid preparations. It is advantageous in some cases to use mixtures of different carriers. As dispersing agents it is possible to use, e.g.: condensation products of sulphonated naphthalene and sulphonated naphthalene derivatives with formaldehyde, condensation products of naphthalene or of naphthalenesulphonic acids with phenol and formaldehyde, as well as alkali, ammonium and alkaline-earth metal salts of ligninsulphonic acid, also alkylaryl sulphonates, alkali metal salts and alkaline-earth metal salts of dibutyl naphthalenesulphonic acid, fatty alcohol sulphates such as salts of sulphated hexadecanols, heptadecanols, octadecanols, and salts of sulphated fatty alcohol glycol ether, the sodium salt of oleyl methyl tauride, ditertiary acetylene glycols, dialkyl dilauryl ammonium chloride, and fatty acid alkalimetal and alkaline-earth metal salts.

Suitable anti-foam agents are, for example, silicones.

The active substances are so mixed, ground, sieved and strained with the above mentioned additives that the solid constituent in the case of wettable powders has a particle size not exceeding 0.02 to 0.04 mm, and in the case of pastes not exceeding 0.03 mm. For the preparation of emulsion concentrates and pastes are used dispersing agents such as those mentioned in the preceding paragraphs, organic solvents, and water. Suitable solvents are, e.g. the following: alcohols, benzene, xylenes, toluene, dimethylsulphoxide, and mineral oil fractions boiling in the range of 120° to 350°. The solvents must be practically odourless, non-phytotoxic, inert to the active substances, and not readily inflammable.

Furthermore, the agents according to the invention can be used in the form of solutions. For this purpose the active substance (or several active substances) of the general formula I is (or are) dissolved in suitable organic solvents, mixtures of solvents, or water. As organic solvents it is possible to use aliphatic and aromatic hydrocarbons, their chlorinated derivatives, alkylnaphthalenes, mineral oils on their own or in admixture with each other. The solutions should contain the active substances in a concentration of from 1 to 20 percent.

To the described agents according to the invention may be added other biocidal active substances or agents. For the widening of their sphere of action, the new agents can also contain, in addition to the stated compounds of the general formula I, e.g. insecticides, fungicides, bactericides, fungistatics, bacteriostatics or nematocides. The agents according to the invention can also contain fertilisers, trace elements, etc..

Other herbicids for the widening of the sphere of action, which can be added, come, for example, from the series of triazines such as halogenodiamino-s-triazines, alkoxy- and alkylthio-diamino-s-triazines, triazoles, diazines such as uracils, aliphatic carboxylic acids and halogenocarboxylic acids, halogenated benzoic acids and phenylacetic acids, aryloxyalkanecarboxylic acids, hydrazides, amides, nitriles, esters of such carboxylic acids, carbamic acid esters and thiocarbamic acid esters, ureas, etc..

Preparations of the herbicidal agents according to the invention are described in the following. The term 'parts' denotes parts by weight.

GRANULATE

The following substances are used for the preparation of a 5 percent granulate:

| | | |
|---|---|---|
| 5 | parts of | 1-[2'-methylsulphonyl-1',3',4'-thiadiazol-5'-yl]-3-methyl-4-hydroxy-2,5-dioxo-imidazolidine, |
| 0.25 | part of | epichlorohydrin, |
| 0.25 | part of | cetyl polyglycol ether, |
| 3.50 | parts of | polyethylene glycol, |
| 91 | parts of | kaolin (particle size 0.3 – 0.8 mm). |

The active substance is mixed with epichlorohydrin and dissolved in 6 parts of acetone; polyethylene glycol and cetyl polyglycol ether are then added. The thus obtained solution is sprayed on to kaolin, and evaporation subsequently performed in vacuo.

WETTABLE POWDER

The following constituents are used for the preparation of (a) a 50 percnet, (b) a 25 percent and (c) a 10 percent wettable powder:

| | | | |
|---|---|---|---|
| a) | 50 | parts of | 1-[2'-trifluoromethyl-1',3',4'-thiadiazol-5'-yl]-3-methyl-4-chloro-2,5-dioxo-imidazolidine, |
| | 5 | parts of | sodium dibutylnaphthalenesulphonate, |
| | 3 | parts of | naphthalenesulphonic acid/phenolsulphonic acid/formaldehyde condensate 3:2:1, |
| | 20 | parts of | kaolin, |
| | 22 | parts of | Champagne chalk; |
| b) | 25 | parts of | 1-[2'-trifluoromethyl-1'3',4'-thiadiazol-5'-yl]-3-methyl-4-monochloroacetoxy-2,5-dioxo-imidazolidine, |
| | 5 | parts of | the sodium salt of oleyl methyl tauride, |
| | 2.5 | parts of | naphthalenesulphonic acid/formaldehyde condensate, |
| | 0.5 | part of | carboxy methyl cellulose, |
| | 5 | parts of | neutral potassium aluminum silicate, |
| | 62 | parts of | kaolin; |
| c) | 10 | parts of | 1-[3'-trichloromethyl-1',2',4'-thiadiazolyl-(5')]-3-methyl-4-hydroxy-2,5-dioxo-imidazolidine, |
| | 3 | parts of | a mixture of the sodium salts of saturated fatty alcohol sulphates, |
| | 5 | parts of | naphthalenesulphonic acid formaldehyde condensate, |
| | 82 | parts of | kaolin. |

The given active substance is absorbed on to the corresponding carriers (kaolin and chalk), and the whole subsequently mixed and ground. Wettable powders having excellent wettability and suspension properties are obtained. It is possible to obtain from such wettable powders, by dilution with water, suspensions of any desired concentration of active substance. Such suspensions are employed for the control of weeds and wild grasses in cultivated crops.

PASTE

The following substances are used for the preparation of a 45 percent paste:

| | | |
|---|---|---|
| 45 | parts of | 1-[2'-dimethylsulphamoyl-1',3',4'-thiadiazolyl(5')]-3-methyl-4-hydroxy-2,5-dioxo-imidazolidine, |
| 5 | parts of | sodium aluminium silicate, |
| 14 | parts of | cetyl polyglycol ether having 8 moles of ethylene oxide, |
| 1 | part of | oleyl polyglycol ether having 8 moles of ethylene oxide, |
| 2 | parts of | spindle oil, |
| 10 | parts of | polyethylene glycol, |
| 23 | parts of | water. |

The active substance is intimately mixed and ground with the additives in suitable apparatus. A paste is obtained from which can be obtained, by dilution with water, suspensions of any desired concentration.

EMULSION CONCENTRATE

The following constituents are mixed together for the preparation of a 10 percent emulsion concentrate:

| | | |
|---|---|---|
| 10 | parts of | 1-[2'-methylthio-1',3',4'-thiadiazolyl(5')-3-methyl-4-hydroxy-2,5-dioxo-imidazolidine, |
| 15 | parts of | oleyl polyglycol ether having 8 moles of ethylene oxide, |
| 75 | parts of | isophorone. |

This concentrate can be diluted with water to obtain emulsions of suitable concentrations. Such emulsions are suitable for the control of weeds in cultivated crops, such as, e.g. in wheat, maize, etc..

We claim:

1. 1-thiadiazolyl-2,5-dioxo-imidazolidines of formula I

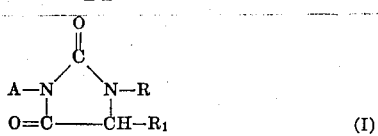

(I)

wherein

A represents a 1,2,4-thiadiazolyl-(5)- or 1,3,4-thiadiazolyl-(5)-radical which is substituted on the only substitutable C-atom, in the 3- or 2-position, by halogen-alkyl, alkylthio, alkylsulphinyl, alkylsulphonyl or dialkylsulphamoyl, the alkyl groups of which contain from 1 to 3 carbon atoms, R represents a $C_1$–$C_3$ alkyl radical, $R_1$ represents halogen, or a radical —$OR_2$ wherein $R_2$ denotes hydrogen, or the group —CO-Z wherein Z stands for alkylamino, dialkylamino, alkyl, halogenoalkyl or alkylthio, the alkyl groups of which contain from 1 to 3 carbon atoms, and, finally, wherein $R_1$ also represents a group of the formula

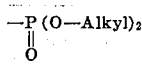

or

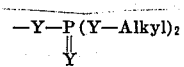

wherein Alkyl represents $C_1$–$C_3$ alkyl groups and the individual substituents Y independently of each other represent oxygen or sulphur.

2. 1-[1',3',4'-Thiadiazol-5'-yl]-2,5-dioxo-imidazolidines according to claim 1, wherein R represents the methyl group and $R_1$ the hydroxyl group.

3. 1-[1',3',4'-thiadiazol-5'-yl]-2,5-dioxoimidazolidines according to claim 1, wherein R represents the methyl group, and $R_1$ represents halogen, a halogenoacetyl, alkylcarbamoyloxy, dialkylcarbamoyloxy, or an O,O-dialkyldithiophosphoryl group, the alkyl groups of which contain 1 to 3 carbon atoms.

4. 1-[2'-Methylsulphonyl-1',3',4'-thiadiazol-5'-yl]-3-methyl-4-hydroxy-2,5-dioxo-imidazolidine according to claim 3.

5. 1-[2'-Trifluoromethyl-1',3',4'-thiadiazol-5'-yl]-3-methyl-4-chloro-2,5-dioxo-imidazolidine according to claim 3.

6. 1-[2'-Trifluoromethyl-1',3',4'-thiadiazol-5'-yl]-3-methyl-4-monochloroacetoxy-3,5-dioxo-imidazolidine according to claim 3.

7. 1-[2'-Trifluoromethyl-1',3',4'-thiadiazol-5'-yl]-3-methyl-4-[0,0-dimethyldithiophosphoryl]-2,5-dioxo-imidazolidine according to claim 3.

8. 1-[2'-Trifluoromethyl-1',3',4'-thiadiazol-5'-yl]-3-methyl-4-methylcarbamoyloxy-2,5-dioxo-imidazolidine according to claim 3.

9. Process for the production of substituted 1-thiadiazolyl-2,5-dioxo-imidazolidines of formula 1 of claim 1, the said process comprising the reaction of a substituted thiadiazolylurea of formula II

A - NH - CO - NH - R    II.

wherein A and R have the meanings given under formula I, with glyoxylic acid in an organic solvent.

* * * * *